March 24, 1970 W. B. GAUNT, JR 3,502,823

HYBRIDLESS BILATERAL TRANSMISSION CIRCUIT

Filed Oct. 26, 1967 2 Sheets-Sheet 1

INVENTOR
W. B. GAUNT, JR.
BY
J. S. Cubert
ATTORNEY

March 24, 1970 W. B. GAUNT, JR 3,502,823

HYBRIDLESS BILATERAL TRANSMISSION CIRCUIT

Filed Oct. 26, 1967 2 Sheets-Sheet 2

3,502,823
HYBRIDLESS BILATERAL TRANSMISSION CIRCUIT

Wilmer B. Gaunt, Jr., Boxford, Mass., assignor to Bell Telephone Laboratories, Incorporated, Murray Hill and Berkeley Heights, N.J., a corporation of New York Filed Oct. 26, 1967, Ser. No. 678,352
Int. Cl. H04b 3/20
U.S. Cl. 179—170 10 Claims

ABSTRACT OF THE DISCLOSURE

A signal transfer arrangement using hybridless bilateral transmission circuits is described which permits exchange of signals between a station and the common interconnection network of a communication system. The bilateral transmission circuit includes a feedback arrangement and a plurality of attenuator networks to provide an accurate impedance match between the station and the common network. Compandor operation is realized through the selective use of nonlinear elements in the attenuator networks.

BACKGROUND OF THE INVENTION

This invention is related to transmission arrangements and, more particularly, to hybridless bilateral transmission arrangements for communication and related systems.

In telephone and other communication systems, signals may be exchanged between stations that are interconnected through a switching network. It is often desirable to insert one or more bilateral transmission circuits in the path between the connected stations. Such transmission circuits may operate to alter the magnitudes of the exchanged signals, to provide better signal-to-noise response by compressing signals applied to the common network and by expanding signals applied to the station, and to reduce signal losses and reflections by improving the impedance match between the connected stations and the network.

One type of bilateral transmission circuit priorly known in the art comprises a pair of unidirectional amplifiers arranged to achieve bidirectional operation. Circuits of this type, which require the output of each amplifier to be coupled to the input of the other amplifier, often include hybrid connections between the stations and the transmission path so that signals from the connected stations do not return to their source and create regenerative disturbances.

A second type of priorly known transmission circuit obviates the need for hybrid connections and duplication of circuits through the use of switches responsive to the station signals, which switches reverse the direction of a unilateral transmission circuit in accordance with the source of signals. The circuits incorporating such switching arrangements have resulted in less than optimum transmission because of the delays in switch response and the difficulty encountered in controlling switches from signal sources having wide dynamic ranges.

In a third type of priorly known circuit, one group of frequencies is assigned to signal transmission in a first direction and another group of frequencies is assigned to signal transmission in the opposite direction. No switching is required in this last type of circuit, but complicated circuit arrangements are introduced because it is required to shaft station signals to the desired frequencies and back again.

The hereinbefore mentioned transmission circuits generally do not include arrangements for compressing signals transmitted from a connected station and for expanding signals transmitted to the connected station. Such compandor operation has required a separate transmission circuit at each station. Compression and expansion of signals has been accomplished by nonlinear feedback elements. It has been necessary to match the feedback circuitry of a compressor at one station precisely to the expandor at a connected station. In the absence of an accurate match of circuit parameters, the desired increase in signal-to-noise ratio cannot be achieved. Thus, if it was desired to compand signals between stations and simultaneously provide bidirectional transmission, complex combinations of circuits were required.

BRIEF SUMMARY OF THE INVENTION

This invention is a signal transfer system in which a transmission path comprises a hybridless bilateral transmission circuit connected between a station and a transmission network. The bilateral circuit transmits outgoing signals from the station to the transmission network and incoming signals from the transmission network to the station. The bilateral circuit comprises a feedback network that applies a signal responsive to the sum of the outgoing and incoming signals to both the junction of the station with the bilateral circuit and the junction of the transmission network with the bilateral circuit. The portion of the incoming signal responsive to the outgoing signal is in phase opposition to and partially cancels the outgoing signal so that stable hybridless transmission is achieved. In this manner, signals are simultaneously exchanged between the network and the station via a hybridless bilateral circuit.

According to one aspect of this invention, the outgoing and incoming signals are coupled to a summing amplifier, the output of which is proportional to the sum of the outgoing and incoming signals. The summing amplifier output signal is fed back via a coupling arrangement to the junction between the bilateral circuit and the station and via another coupling arrangement to the junction between the transmission network and the bilateral circuit. At the junction of the bilateral circuit with the station, the portion of the summing amplifier output signal due to the outgoing signal partially cancels the outgoing signal, but the portion of the summing amplifier output signal due to the incoming signal is applied to the station. The output signal from the summing amplifier is also applied to the transmission network.

According to a second aspect of this invention, the outgoing and incoming signals are coupled to the summing amplifier through first and second attenuators, respectively, and the coupling arrangements between the summing amplifier, the transmission network, and the first station also comprise attenuators. These attenuators are adjusted in relation to the impedances of the station and the transmission network so that the ratio of the outgoing signal appearing at the transmission network to the outgoing signal from the station is equal to the ratio of the attenuation factor of the first attenuator to the attenuation factor of the second attenuaor and is also equal to the ratio of the incoming signal from the transmission network to the incoming signal appearing at the station. This adjustment of the attenuators simultaneously provides a proper impedance match between the bilateral circuit and the station and between the bilateral circuit and the transmission network.

According to a third aspect of this invention, the attenuator between the station and the summing amplifier and the attenuator coupling the summing amplifier to the transmission network are nonlinear compressing type attenuators characterized by nonlinear voltage functions that are proportional to one another. The compressing type attenuators in conjunction with the summing amplifier and the feedback connections cause the outgoing signal, which passes through the compressing means in the transmission circuit, to be compressed and the inoming signal, passing through the linear coupling means f the bilateral transmission circuit, to be expanded. The ompandor operation is realized while the transmission atios and the impedance match according to the second spect of this invention are maintained.

DETAILED DESCRIPTION

Figure 1:
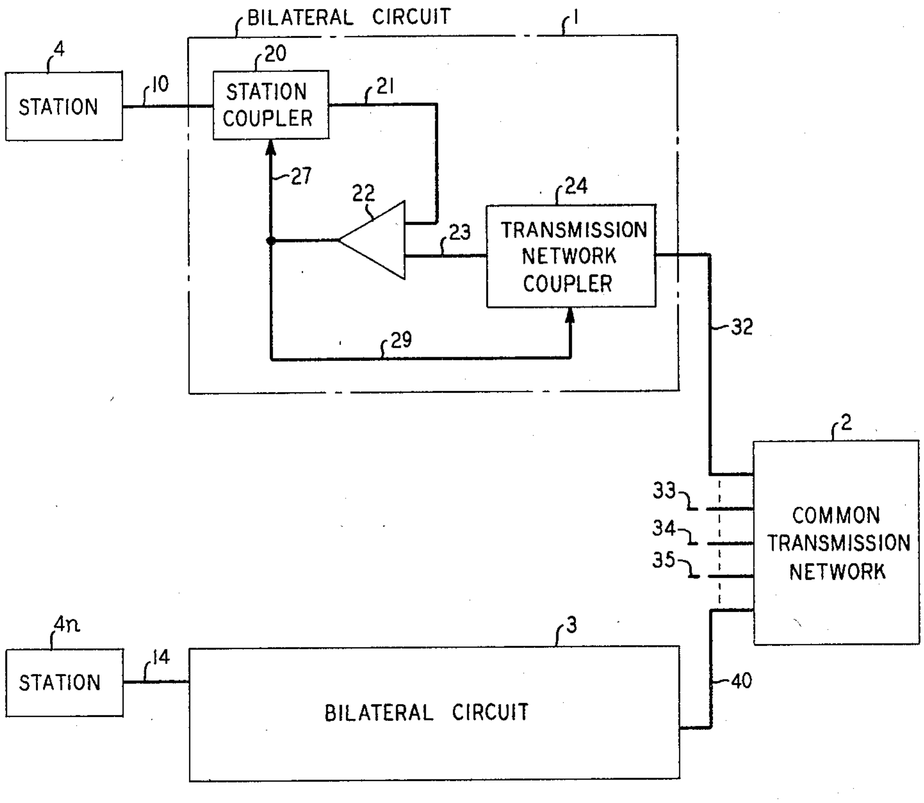
FIG. 1 is a generalized block diagram illustrating this nvention.

FIG. 1 shows a signal transfer system in accordance vith this invention wherein bilateral circuit 1 is onnected between communication line 10 and common ransmission network 2, and bilateral circuit 3 is conected between communication line 14 and network 2. Network 2 may be an interconnection network comprising witching arrangements. Other bilateral transmission ciruits, not shown, may also be connected to transmission etwork 2 via lines such as 33, 34, and 35. The comunication lines, such as 10, may be further connected o a single station 4 or to a plurality of stations through n appropriate switching network, for example, a time ivision multiplex switch.

An outgoing signal from station 4 appearing on line 0 is applied to station coupler 20 which couples this ignal to summing amplifier 22 through lead 21. An inoming signal from transmission network 2 is applied to ransmission network coupler 24 via line 32. This inoming signal may originate from bilateral circuit 3 or rom other bilateral circuits not shown. The incoming ignal is coupled via lead 23 to amplifier 22. The output ignal from amplifier 22 is proportional to the sum of he outgoing signal appearing on lead 21 and the incoming ignal appearing on lead 23. This signal from amplifier 2 is fed back to coupler 20 via lead 27 and to coupler 4 via lead 29.

The signal fed back to coupler 20 comprises a signal esponsive to the outgoing signal and a signal responsive o the incoming signal from network 2. The signal at oupler 20 responsive to the outgoing signal partially ancels the outgoing signal on line 10 so as to stabilize ignal transmission, but the signal responsive to the inoming signal appearing on lead 27 is applied to station via line 10. In like manner, the signal responsive to e incoming signal applied to coupler 24 from lead 29 is artially canceled by the incoming signal from line 32, ut the outgoing signal from lead 29 is transmitted to etwork 2 via line 32. The outgoing signal is then transitted from network 2 to another of the bilateral circuits, ch as circuits 3, via line 40. The negative feedback hich provides partial cancellation of the outgoing signal the bilateral circuits associated with connected stations ermits the simultaneous exchange of signals therebeveen without hybrid connections in accordance with is invention.

Figure 2:
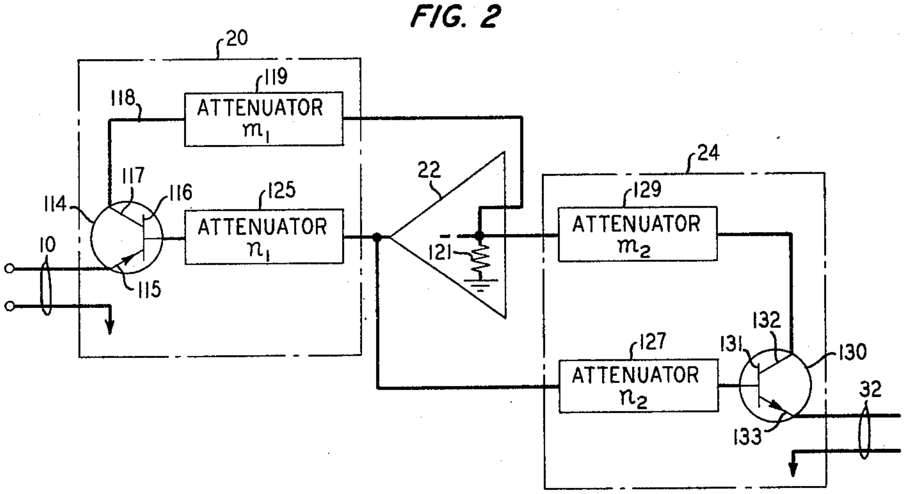
FIG. 2 is a schematic diagram of one embodiment of his invention.

Couplers 20 and 24 may comprise attenuator networks djusted so that the impedance of bilateral circuit 1 at e junction of circuit 1 with line 10 is matched to the haracteristic impedance of line 10, and the impedance t the junction of circuit 1 with line 32 matches the charcteristic impedance of line 32. As shown in FIGS. 2 nd 3, these attenuator networks may also be arranged compress outgoing signals passing through circuit 1 nd to expand incoming signals passing through circuit 1 hile maintaining the impedance match between the ansmission circuit and lines 10 and 32.

FIG. 2 shows an embodiment of the bilateral circuit 1 which PNP transistor 114 and attenuator networks 119 and 125 form station coupler 20, and NPN transistor 130 and attenuator networks 127 and 129 form transmission networks 127 and 129 form transmission network coupler 24. Amplifier 22 is shown, in this instance, with internal resistor 121.

Figure 4A:
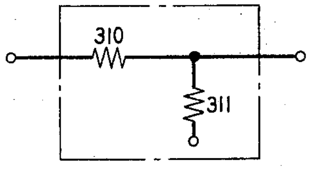
FIGS. 4A and 4B depict two forms of attenuator netvorks which may be used in the embodiments of FIGS. and 3.

The circuit of FIG. 2 operates as follows. An outgoing signal is applied to line 10 which for purposes of illustration is assumed to have a characteristic impedance $Z_1$. This signal causes a signal current $i_1$ to flow into emitter 115 of PNP transistor 114. A voltage equal to the outgoing signal voltage less $i_1Z_1$ appears at emitter 115. The current $i_1$ is coupled via the emitter-collector path of transistor 114 to lead 118 substantially without loss, and the current is applied therefrom to attenuator network 119. Attenuator 119 may comprise linear elements as shown in FIG. 4A or, alternatively, may comprise nonlinear elements such as back to back connected diodes 314 and 315 illustrated in FIG. 4B. It is assumed for purposes of this description that attenuator 119 contains linear elements and has an attenuation factor of $m_1$. Thus, a current $i_1$ applied to the input of attenuator 119 results in a current $i_1/m_1$ at the output of attenuator 119. This current passes through resistor 121.

If no signal is applied to line 32, the signal voltage across resistor 121 is amplified in amplifier 22 so that a signal voltage appears at the output of amplifier 22 in response to the current $i_1/m_1$. This signal voltage passes through attenuator 125 and is applied therefrom to base 116. It is also applied to base 131 of NPN transistor 130 through attenuator 127. Attenuators 125 and 127 are assumed to comprise linear elements and are further assumed to have attenuation factors $n_1$ and $n_2$, respectively. Due to the negative feedback connections in the bilateral circuit, a stable signal voltage is obtained. This is so because the signal voltage from attenuator 125 at base 116 is effective to partially cancel the outgoing signal voltage at emitter 115. Since a signal voltage is applied to base 131, this signal voltage is coupled through the base-emitter path of transistor 130, appears at emitter 133, and is applied to line 32.

Line 32 is assumed to have a characteristic impedance $Z_2$. Therefore, a current $i_2$ flows out of emitter 133 and causes a substantially equal current to flow into collector 132. The current $i_2$ passes through attenuator 129 and is applied to resistor 121. It is attenuated by a factor $m_2$, the attenuation factor of attenuator 129. Thus, the net current flowing in resistor 121 is $$\frac{i_1}{m_1}-\frac{i_2}{m_2}.$$

The current $i_2$ flowing through characteristic impedance $Z_2$ causes a signal voltage $v_2$ to appear at emitter 133. This signal voltage is substantially the same as the signal voltage at base 131. Under the hereinbefore described conditions the signal voltage at the output of amplifier 22 is $n_2v_2$. If the gain of amplifier 22 is A, a signal voltage $n_2v_2/A$ appears at the input to amplifier 22. But the signal voltage at the input of amplifier 22 is the voltage across resistor 121 due to the currents $i_1/m_1$ and $i_2/m_2$. Therefore, $$\frac{i_1}{m_1}-\frac{i_2}{m_2}=\frac{n_2v_2}{AR} \qquad (1)$$

where R is the value of resistor 121. This is true because the currents $i_1$ and $i_2$ flow in opposite directions. Transistors 114 and 130 are of opposite conductivity types so that the coupling of collector currents between two transistors can be readily accomplished.

In order to show that the impedance presented to line 10 by the bilateral circuit is equal to the characteristic impedance of line 10, the signal voltage at emitter 115, $v_1$, appearing in response to the current $i_1$ from line 10 is calculated. The input impedance $Z_{in}=v_1/i_1$ may then be evaluated. This voltage $v_1$ is the same as the voltage at the output of amplifier 22 ($n_2v_2$) divided by the attenuation factor $n_1$, since the signal voltage $n_2v_2$ passes through attenuator 125. By combining Equation 1 and the last-mentioned expression, the input impedance to the bilateral transmission circuit is calculated to be $$Z_{in}=\frac{1}{\frac{m_1n_1}{m_2n_2z_2}+\frac{n_1m_1}{AR}} \quad (2)$$

Where the gain A of amplifier 22 is very large so that the term $n_1m_1/AR$ can be neglected, Equation 2 reduces $m_2n_2Z_2/m_1n_1$. By selecting the attenuation factors so that $$\frac{m_2n_2}{m_1n_1}=\frac{Z_1}{Z_2} \quad (3)$$

the input impedance $Z_{in}$ is made equal to the characteristic impedance of line 10, i.e., $Z_1$.

Figure 4B:
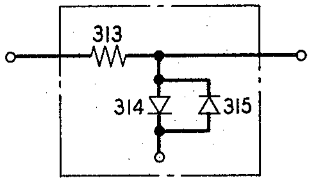

It has been assumed that the attenuator networks of the bilateral transmission circuit comprise linear elements as illustrated in FIG. 4A. If the attenuator network illustrated in FIG. 4B is used in attenuators 119 and 127, diodes 314 and 315 will cause large voltage signals to be attenuated to a greater extent than small voltage signals and the signal voltage across the diodes will be limited so that the output from the network is compressed. Such nonlinear elements may be used in accordance with this invention without disturbing the impedance matching hereinbefore described provided that the nonlinear attenuation factor $m_1$ is identical in form to the nonlinear attenuation factor $n_2$. In this case the ration $n_2/m_1$ of Equation 3 is unaffected by the nonlinearities.

The bilateral transmission circuit, in accordance with this embodiment of the invention, operates as a compandor wherein outgoing signals passing through the circuit are compressed and incoming signals passing through the circuit are expanded if the nonlinear attenuator network of FIG. 4B is used as hereinbefore desired. To show this feature, the signal transfer function through the bilateral circuit is calculated. Under the condition that the characteristic impedance of line 10 is matched at its junction with the bilateral circuit, Equation 1 may be expressed as $$\frac{v_1}{m_1Z_1}-\frac{v_2}{m_2Z_2}=\frac{n_2v_2}{AR} \quad (4)$$

By re-arranging Equation 4, it is seen that the transfer function $$\frac{v_2}{v_1}=\frac{1}{\frac{m_1Z_1}{m_2Z_2}+\frac{m_1n_2Z_1}{AR}} \quad (5)$$

When the gain A of amplifier 22 is sufficiently large, so that the expression $m_1n_2Z_1/AR$ is negligible, the transfer function is reduced to $m_2Z_2/m_1Z_1$. The transfer function describing the signal voltage at line 10 responsible to the signal voltage applied to the bilateral circuit at line 32 is the reciprocal of the just-mentioned relationship. This is so because of the symmetry of the bilateral circuit. Thus, if the ratio $m_2/m_1$ is less than unity so that compression of outgoing signals is achieved, incoming signals are expanded. Because of the nonlinear attenuation factor $m_1$, the desired compression and expansion is obtained.

Figure 3:
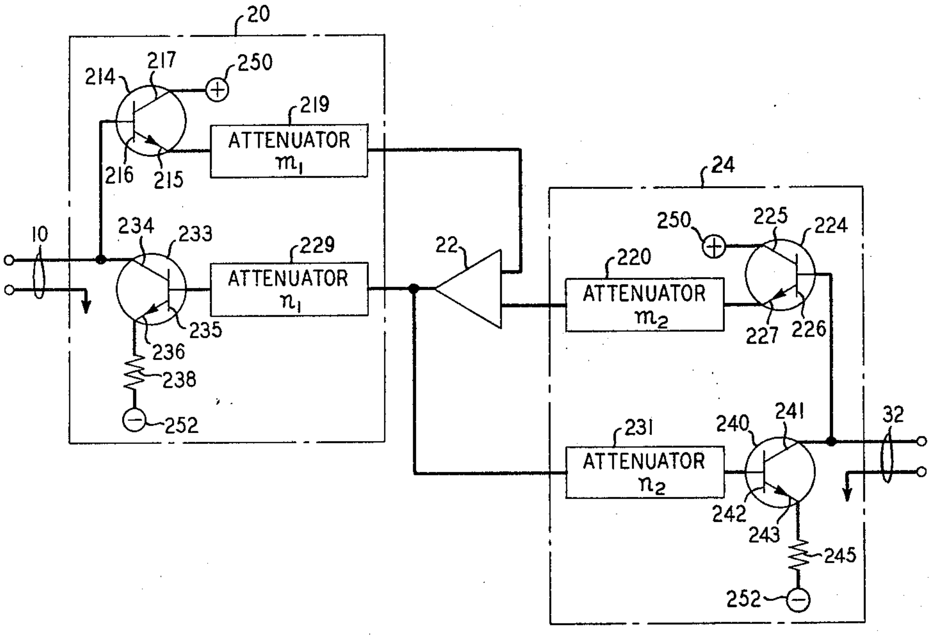
FIG. 3 is a schematic diagram of a second embodiment f this invention.

FIG. 3 shows bilateral circuit 1 according to another embodiment of this invention. In FIG. 3 station coupler 20 comprises NPN transistors 214 and 233 and attenuators 219 and 229. While NPN transistors are used in this embodiment, it is understood that PNP transistors or similar coupling devices may also be utilized by those skilled in the art. Transmission network coupler 24 comprises NPN transistors 224 and 240 and attenuators 220 and 231. Positive voltage source 250 provides an appropriate D.C. biasing voltage for transistors 214 and 224 and negative voltage source 252 provides an appropriate D.C. negative return voltage for transistors 233 and 240. The inputs to amplifier 22 are connected to attenuators 219 and 220 and the output of amplifier 22 is connected to the inputs of attenuators 229 and 231. Amplifier 22 develops a signal proportional to the sum of the outputs of attenuators 219 and 220 in the same manner as amplifier 22 of FIGS. 1 and 2. For purposes of description, it is assumed that attenuators 219 and 220 have attenuation factors $m_1$ and $m_2$, respectively, and attenuators 229 and 231 have attenuation factors $n_1$ and $n_2$, respectively. It is further assumed that an outgoing signal voltage is applied to line 10 and no signal is applied to line 32.

The signal voltage applied to line 10 results in signal voltage $v_1$ at base 216 of transistor 214. This voltage, $v_1$, is coupled to emitter 215 substantially without loss and is applied therefrom to attenuator 219. The output voltage from attenuator 210 is $v_1/m_1$ since it has an attenuation factor of $m_1$. This signal voltage is applied to one input of amplifier 22. The output of amplifier 22 is fed back via attenuator 229 and the base-collector path of transistor 233 to line 10 and base 216 of transistor 214. The output of amplifier 22 is also applied through attenuator 231 and the base-collector path of transistor 240 to line 32 and base 226 of transistor 224.

In response to signal voltage $v_1$, a current $i_2$ will flow into line 32 causing a voltage $v_2$ to appear across the output impedance associated with line 32 and the transmission network connected thereto. This output impedance is $Z_2$. The voltage $v_2$, in turn, is coupled to the second input of amplifier 22 via transistor 224 and attenuator 220 so that a voltage $v_2/m_2$ appears at this input. Assuming that resistor 245 has a value R, a voltage $Rv_2/Z_2$ appears at emitter 243, which voltage requires a voltage $n_2Rv_2/Z_2$ at the output of amplifier 22 in the feedback arrangement. This voltage divided by the gain A of amplifier 22

$$\frac{n_2Rv_2}{AZ_2}=\frac{v_1}{m_1}-\frac{v_2}{m_2} \quad (6)$$

is present at the summing point in amplifier 22. The voltages at base 235 and consequently at emitter 236 are substantially $n_2Rv_2/n_1Z_2$, where R is also the value of resistor 238. The current flowing from emitter 236 is substantially the same as the current flowing in collector 234. The current flowing into base 216 is negligible because of the high gain of this transistor and the load current of line 10 is the current flowing into collector 234. Therefore, $$i_1=\frac{n_2v_2}{n_1Z_2} \quad (7)$$

The input impedance of the circuit of FIG. 3 at the junction with line 10 can be calculated in terms of the current $i_1$ flowing into collector 234 and the voltage applied to base 216 from the line 10. In this calculation it is assumed that line 10 and the station connected to it have an associated output impedance $Z_1$. Combining Equations 6 and 7 the input impedance $Z_{in}$ becomes $$\frac{v_1}{i_1}=\frac{m_1n_1}{m_2n_2}Z_2+\frac{m_1n_1R}{A} \quad (8)$$

Where the gain A is sufficiently large to make the second term of Equation 8 negligible, the input impedance $$Z_{in}\frac{n_1m_1}{n_2m_2}Z_2 \quad (9)$$

and, as described with reference to FIG. 2, $Z_{in}$ can be made equal to $Z_1$ provided that the conditions of Equation 3 are met.

As described with regard to FIG. 2, attenuators 219 and 231 may comprise nonlinear elements such as diodes 314 and 315 illustrated in FIG. 4B. As long as the attenuation factors $m_1$ and $n_2$ have identical although nonlinear characteristics, the input impedance at the junction of line 10 with the transmission circuit of FIG. 3 remains matched to the characteristic impedance of line 10. Because of the symmetry of the circuit of FIG. 3, the input impedance at the junction of line 32 with the bilateral ransmission circuit is matched to the characteristic im-edance of line 32. Thus in accordance with this inven-ion, the bilateral circuit of FIG. 3 provides an impedance natch with the common transmission network connected o line 32 and with station 4 or, alternatively, the line rom the group of stations which may be connected to ine 10.

The transfer function of the bilateral circuit of FIG. can readily be calculated under the matched conditions ereinbefore described. If the impedances of lines 10 and 2 are matched to the bilateral circuit, the transfer func-ion can readily be calculated by rearranging Equation 6. t becomes $$\frac{v_2}{v_1}=\frac{1}{\frac{m_1}{m_2}+\frac{n_2Rm_1}{AZ_2}} \qquad (10)$$

s before, if gain A is sufficiently large, the transfer unction becomes $m_2/m_1$. By virtue of the circuit sym-netry, the transfer function in the reverse direction is $n_1/m_2$. Thus, if all the attenuator networks comprise inear elements and the ratio $m_2/m_1$ is less than unity, he outgoing signal from lines 10 is attenuated and the ncoming signal from line 32 is amplified. If nonlinear lements are used in attenuators 219 and 231, as illus-rated in FIG. 4B, the outgoing signal is compressed and he incoming signal is expanded. This is true because at-enuation ratio $m_1$ is nonlinear. It affects large signal oltages applied thereto to a greater extent than small ignal voltages and limits the output signal voltages from he attenuator.

It is to be understood that the hereinbefore described mbodiments are merely illustrative of the principles of his invention. Numerous other arrangements may be de-ised by those skilled in the art without departing from he spirit and scope of this invention. For example, the ircuit shown in FIG. 2 may be readily rearranged to tilize only NPN transistors or only PNP transistors. tation coupler 20 and transmission network coupler 24 f FIG. 1 may further include transformers which permit he coupling together of the signal applied to the bilateral ransmission circuit and the feedback signal developed in he bilateral circuit.

What is claimed is:

1. In a signal transfer system comprising a plurality f stations, a bilateral circuit associated with each of said tations and comprising hybridless means for receiving signal outgoing from the associated one of said stations, ybridless means for receiving a signal incoming from nother station, means for generating a distinct signal orresponding to the sum of said outgoing and incoming ignals, means for applying said distinct signal to said utgoing signal receiving means and means for applying aid distinct signal to said incoming signal receiving neans.

2. A signal transfer system comprising a plurality of tations, a hybridless bilateral circuit associated with each f said stations, a transmission network selectively inter-onnecting said bilateral circuits, means for applying an utgoing signal from a first station to the associated ilateral circuit and means for applying a signal incoming rom said transmission network to said associated bilat-ral circuit, said associated bilateral circuit comprising egatve feedback means for applying a signal correspond-ng to the sum of the outgoing signal and the incoming ignal to the junction between said first station and said orresponding bilateral circuit and to the juction between aid network and said corresponding bilateral circuit.

3. A signal transfer system according to claim 2 vherein said associated bilateral circuit further comprises neans including first attenuating means and a first tran-istor for coupling the outgoing signal to said feedback neans and means including second attenuating means nd a second transistor for coupling the incoming signal o said feedback means, and wherein said feedback means comprises amplifying means for deriving a signal pro-portional to the sum of said outgoing and incoming sig-nals, first means including third attenuating means for applying said sum signal to said outgoing signal coupling means and second means including fourth attenuating means for applying said sum signal to said incoming sig-nal coupling means.

4. A signal transfer system according to claim 3 where-in said first attenuating means comprises means for com-pressing said outgoing signal and said fourth attenuating means comprises means for compressing the signal from said amplifying means.

5. A signal transfer system according to claim 3 where-in said first sum signal applying means further comprises a third transistor connected between said third attenuat-ing means and said first transistor, and wherein said sec-ond sum signal applying means further comprises a fourth transistor connected between said fourth attenuat-ing means and said second transistor.

6. A signal transfer system according to claim 3 where-in said first station and said transmission network each have an associated output impedance and the ratio of the product of the attenuation factor of said first at-tennuating means and the attenuation factor of said fourth attenuating means to the product of the attenua-tion factor of the second attenuating means and the at-tenuation factor of said third attenuating means is equal to the ratio of the characteristic impedance at the junc-tion of said station with said bilateral circuit to the char-acteristic impedance at the junction of said bilateral cir-cuit with said transmission network, whereby the imped-ances of said bilateral circuit at said junctions are matched to the associated impedances of the station and the net-work, respectively.

7. In a communication system having a plurality of stations, a hybridless bilateral transmission circuit con-nected between each of said stations and a network se-lectively interconnecting said bilateral circuits compris-ing a first transistor of one conductivity type and a sec-ond transistor of the opposite conductivity type, each of said transistors having an emitter, a base and a col-lector, a summing amplifier having input and output ter-minals, means for applying an outgoing signal from a first station to the emitter of said first transistor, means for applying a signal incoming from said interconnecting network to the emitter of said second transistor, means for transmitting said outgoing signal from the collector of said first transistor to said summing amplifier input terminal, means for transmitting said incoming signal from the collector of said second transistor to said sum-ming amplifier input terminal, means for transmitting the signal from said summing amplifier output terminal to the base of said first transistor and means for trans-mitting the signal from said summing amplifier output terminal to the base of said second transistor.

8. In a communication system having a plurality of stations, a hybridless bilateral transmission circuit con-nected between each of said stations and a network se-lectively interconnecting said bilateral circuits compris-ing first, second, third and fourth transistors each having an emitter, a base and a collector, means for applying an outgoing signal from a first station to said first tran-sistor base, means for applying an incoming signal from said interconnecting network to said second transistor base, a summing amplifier having two input terminals and an output terminal, means for transmitting said out-going signal from said first transistor emitter to one input terminal of said summing amplifier, means for transmitting said incoming signal from said second tran-sistor emitter to the other input terminal of said sum-ming amplifier, means for transmitting the signal ap-pearing at said summing amplifier output terminal to said third transistor base, said third transistor collector being connected to said first transistor base, and means for transmitting the signal appearing at said summing amplifier output terminal to said fourth transistor base, said fourth transistor collector being connected to said second transistor base.

9. A communication system comprising a plurality of stations and a network for interconnecting said stations, a compandor circuit connected between said network and each of said stations for transmitting incoming signals from said network to the corresponding station and for transmitting outgoing signals from said corresponding station to said network, said compandor circuit comprising means for compressing said outgoing signals, a summing amplifier responsive to said incoming and compressed outgoing signals, means for applying the output of said summing amplifier to said corresponding station, means for compressing said summing amplifier output and means for applying said compressed summing amplifier output to said interconnecting network.

10. A bilateral compandor circuit having first and second terminals, means for compressing a signal received at said first terminal and means for amplifying the sum of said compressed signal and a signal received at said second terminal, characterized in that first feedback means are connected between said amplifying means and said first terminal to apply the signal from said amplifying means to said first terminal and second feedback means are connected between said amplifying means and said second terminal to compress the signal from said amplifying means and to apply said compressed amplified signal to said second terminal.

References Cited

UNITED STATES PATENTS 2,825,764 3/1958 Edwards ---------- 179—170.2

WILLIAM C. COOPER, Primary Examiner

W. A. HELVESTINE, Assistant Examiner

U.S. Cl. X.R.

179—170.2